United States Patent [19]

Churchland et al.

[11] Patent Number: 4,508,772

[45] Date of Patent: Apr. 2, 1985

[54] PRESSED COMPOSITE ASSEMBLY AND METHOD

[75] Inventors: Mark T. Churchland, Vancouver; David Parker, West Vancouver, both of Canada

[73] Assignee: MacMillan Bloedel Limited, Vancouver, Canada

[21] Appl. No.: 547,577

[22] Filed: Nov. 1, 1983

[51] Int. Cl.$^3$ .......................... B29J 5/02; B29J 5/04; B32B 5/08; B32B 31/20

[52] U.S. Cl. .......................... 428/106; 156/62.8; 156/296; 264/112; 264/113; 264/123; 264/320; 264/331.22; 428/112; 428/113; 428/537.1; 428/903.3

[58] Field of Search .......... 428/106, 112, 113, 903.3, 428/537.1; 156/62.8, 296; 264/112, 113, 123, 320, 331.22, DIG. 75

[56] References Cited

U.S. PATENT DOCUMENTS

| | | | |
|---|---|---|---|
| 1,416,687 | 5/1922 | Butler . | |
| 3,033,726 | 5/1962 | Howden . | |
| 3,115,431 | 12/1963 | Stokes . | |
| 3,120,862 | 2/1964 | Burger . | |
| 3,202,743 | 8/1965 | Elmendorf . | |
| 3,478,861 | 11/1969 | Elmendorf . | |
| 3,493,021 | 2/1970 | Champigny . | |
| 3,515,255 | 6/1970 | Lee . | |
| 3,723,230 | 3/1973 | Troutner . | |
| 3,792,953 | 2/1974 | Ahrweiler . | |
| 3,807,931 | 4/1974 | Wood . | |
| 3,843,756 | 10/1974 | Talbott . | |
| 3,851,685 | 12/1975 | Ahrweiler . | |
| 3,856,602 | 12/1974 | Colijn . | |
| 3,883,333 | 5/1975 | Ackley . | |
| 3,896,536 | 7/1975 | Keller . | |
| 3,993,426 | 11/1976 | Ahrweiler . | |
| 4,043,732 | 8/1977 | Ahrweiler . | |
| 4,058,201 | 11/1977 | Etzold . | |
| 4,061,819 | 12/1977 | Barnes . | |
| 4,111,294 | 9/1978 | Carpenter . | |
| 4,113,812 | 9/1978 | Talbott . | |
| 4,146,123 | 3/1979 | Cottrell . | |
| 4,213,748 | 7/1980 | Ahrweiler . | |
| 4,232,067 | 11/1980 | Coleman | 428/106 |
| 4,255,477 | 3/1981 | Holman | 428/106 |

FOREIGN PATENT DOCUMENTS

| | | | |
|---|---|---|---|
| 597587 | 5/1960 | Canada | 428/106 |
| 816285 | 7/1959 | United Kingdom . | |

*Primary Examiner*—James C. Cannon
*Attorney, Agent, or Firm*—Banner, Birch, McKie & Beckett

[57] ABSTRACT

The present invention relates to a method of forming an extended elongate pressed composite assembly from a plurality of strands by subjecting the strands to heat and pressure. The improvement of the present invention comprises methods for compressing a particularly arranged composite mat of strands so as to compensate for internal stresses imparted to the pressed composite assembly during its subjection to pressure because of a converging compressing zone and card decking.

20 Claims, 9 Drawing Figures

PRESSED COMPOSITE ASSEMBLY AND METHOD

TECHNICAL FIELD

The present invention relates to a manufacturing technique for preparing pressed composite assemblies with belt presses as well as to the pressed composite assemblies themselves. The pressed composite assemblies are made of a plurality of compressed strands. The present invention is particularly useful in the manufacture of elongated lumber products from wood strands.

BACKGROUND OF THE INVENTION

Numerous types of lumber products have been manufactured by a process where composite assemblies of wood products are coated with an adhesive, and thereafter subjected to compression and heat to form the pressed composite assembly. For example, this technique is used to manufacture particle board from small wood particles and plywood from wood veneer sheets.

A process has recently been developed for manufacturing structural wood products from long, relatively thin strands of wood by coating the strands with an adhesive, arranging the strands side-by-side in a lengthwise dimension of the lumber product and subjecting the arranged strands to heat and compression. By this technique, a high strength dimensioned wood product can be formed. An example of such a process is disclosed in U.S. Pat. No. 4,061,819.

Belt presses, typically used in processes for the manufacture of composite wood products are shown, inter alia, in U.S. Pat. Nos. 3,120,862; 3,723,230; 3,792,953, 3,851,685; 3,993,426; 4,043,732 and 4,213,748. The belt presses are comprised, for example, of facing endless belts between which the material is compressed, and platens and antifriction devices which hold the belts in pressure engagement with the material. In these prior art compression techniques, the inlet end of the press belts, and the platens over which they run, converge toward one another to form a compressing zone.

It has been determined that within the compressing zone of a continuous press, strands are generally free to move with respect to one another for a short period of time. As the belts continue to converge, the strands are no longer free to move but, rather, have positions set with respect to one another. This setting of relative positions can be referred to as "lock-up." After lock-up occurs, further convergence of the press belts only causes further compression of the material. Since lock-up occurs in a converging area, the material being pressed is not in a planar disposition, but rather in a curved disposition. This curved disposition occurs in two opposite directions about a reference plane passing between the belts. Since the material has locked up, the material cannot shift into a planar relationship, rather, the material is forced from this curved disposition into its final planar form. Following passage through the converging portion of the belts, i.e., the compressing zone, the compressed product generally passes through a compression zone in which the belts of the press are parallel.

It has been discovered that a significant part of the curvature of the strands at lock-up remains or is remembered as an internal stress in the pressed composite assembly. When the assembly is a generally thin planar object, such as plywood or particle board sheets, such internal stresses do not present a problem. However, when relatively thick assemblies are manufactured, for example, dimensioned lumber made of wood strands, the internal stresses can present a problem because such thick assemblies may be cut horizontally, thereby releasing the internal stress. Thus, when the lumber product is cut horizontally, the two halves bow in opposite directions.

An additional internal stress problem, which occurs in a continuous process of forming dimensioned lumber products from thin wood strands, such as the product disclosed in U.S. Pat. No. 4,061,819, is a result of the manner in which the strands are arranged prior to their entry into the belt press. As wood strands are aligned to one another in a longitudinal direction and successive layers of strands are laid upon one another, the strands do not rest level upon a preceding strand, but rather a forward end of one strand rests upon a rearward end of a preceding strand. This results in a build-up of strands at an angle above the horizontal. This staggered, overlapping relationship can be referred to as "card decking" because it is similar to the manner in which cards would lay upon one another when they are spread out on a flat surface from a stacked deck. This card decking or angular build-up of the strands results in an internal stress in the dimensioned lumber product produced. Since the build-up occurs in one direction, the stress results in a bowing effect in one direction.

The method and pressed composite assembly of the present invention have been developed to compensate in various ways for these internal stress problems.

SUMMARY OF THE INVENTION

In a first aspect, the present invention relates to a method of forming an extended elongate pressed composite assembly from a plurality of strands by subjecting the strands to heat and pressure. The improvement of the present invention comprises a method for compressing a particularly arranged composite mat of strands so as to compensate for internal stresses imparted to the pressed composite assembly during its subjection to pressure because of the card decking effect of the strands. This method includes the steps of:

(a) forming a first lay-up containing a plurality of strands in a generally parallel, longitudinally aligned relationship and in a generally random overlapping relationship wherein succeeding strands generally overlap only a portion of preceding strands so that the strands are, on the average, angled above the horizontal;

(b) forming a second lay-up containing a plurality of strands in a generally parallel, longitudinally aligned relationship and in a generally random overlapping relationship wherein succeeding strands generally overlap only a portion of preceding strands so that the strands are, on the average, angled above the horizontal;

(c) inverting one of said first or second lay-ups and positioning it on top of the other of said first or second lay-ups to form a composite mat; and (d) transporting the composite mat through a compressing zone of a press assembly whereby the internal stress in each half of the pressed composite assembly due to the angle at which the strands are stacked is offset by the internal stress in the opposing half of the pressed composite assembly.

In a second aspect, the present invention relates to a method of forming an extended elongate pressed composite assembly from a plurality of strands by subjecting the strands to heat and pressure. The improvement of the present invention comprises a method for compressing a particularly arranged composite mat of strands so as to compensate for internal stresses imparted to the pressed composite assembly during its subjection to pressure because of both the curvature imparted to the strands in the compressing zone and card decking. The pressed composite assembly produced by this method can be split or cut horizontally without the separate pieces bowing. The method includes the steps of:

(a) forming a first lay-up containing a plurality of strands in a generally parallel, longitudinally aligned relationship and in a generally random overlapping relationship wherein succeeding strands generally overlap only a portion of preceding strands so that the strands are, on the average, angled above the horizontal;

(b) forming a second lay-up containing a plurality of strands in a generally parallel, longitudinally aligned relationship and in a generally random overlapping relationship wherein succeeding strands generally overlap only a portion of preceding strands so that the strands are, on the average, angled above the horizontal;

(c) inverting one of said first or second lay-ups and positioning it above the other of said first or second lay-ups to form a composite mat; and (d) transporting the composite mat through a compressing zone from an inlet end to an outlet end defined between converging facing walls of a press assembly in a direction such that the apex of the angle formed between the strands of the first lay-up and the strands of the second lay-up points away from the inlet end of the compressing zone thereby inducing an internal stress in horizontal sections of the pressed composite assembly opposite to the internal stress in said sections of the pressed composite assembly due to the angle of the strands in the lay-ups.

Preferably, the pressed composite assembly being formed is an elongated lumber product made from a plurality of generally parallel elongate wood strands, and the press assembly is comprised of a belt press having facing belts trained over platens. The pressure on the wood strands is increased by gradually converging the platens and belts.

In another aspect, the present invention pertains to the pressed composite assembly formed when one card decked strand lay-up is inverted on another card decked strand lay-up forming a composite mat, and the composite mat is compressed in a press assembly. The present invention also pertains to the pressed composite assembly formed when a composite mat, prepared by inverting one card decked strand lay-up and positioning it above another card decked strand lay-up, is compressed in a press assembly with converging belts so as to induce an internal stress in horizontal sections of the assembly which is in a direction opposite to the internal stress in that section due to card decking.

DETAILED DESCRIPTION OF THE INVENTION

Figure 1:
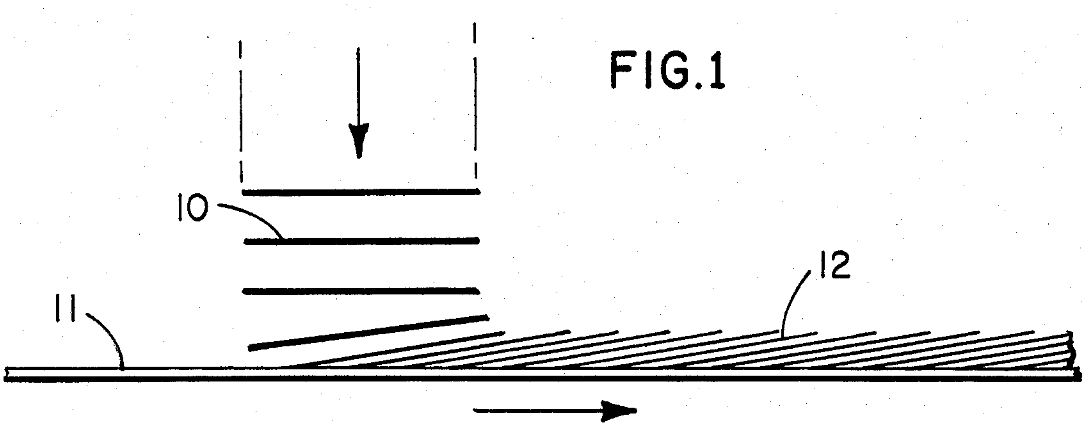
FIG. 1 is a schematic side elevational view of a card decking lay-up process.

FIG. 1 is a schematic illustration of the card-decking phenomenon. Elongate strands 10 are placed on conveyor 11 from a single source which need not move longitudinally along the conveyor to form a lay-up 12. While one end of each newly deposited elongate strand may rest on conveyor 11, the other end rests on a previous strand in the lay-up so that the strands slope upwardly in the direction of travel of conveyor 11. Strand orientation is determined in part by strand length and the speed of conveyor 11. FIG. 1 illustrates a situation in which the strands are oriented at a considerable angle. It is possible to reduce this angle by increasing the dimension or length of conveyor 11 over which the elongate strands 10 are uniformly deposited to form the lay-up 12. Co-pending application Ser. No. 547,578 entitled "Oriented Strand Lay-Up," filed concurrently herewith by Mark Churchland and Walter Schilling, specifically describes this method of minimizing the angle of card decking by forming the lay-up over an extended length of the conveyor.

Figure 2:
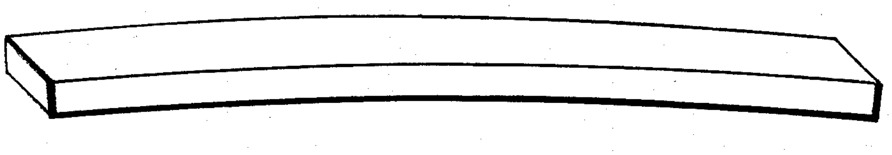
FIG. 2 illustrates an elongate wood product produced of wood strands wherein internal stresses produced by the card decking effect were not relieved.

As noted above, when the strands 10 are deposited on a continuously moving conveyor, succeeding strands generally overlap a portion, but not all, of preceding strands 10. The strands thus do not lie flat, but rather build up at an angle. This is similar to the angulation of cards which are spread out from a stacked deck onto a planar surface, hence, the term "card decking." Disregarding stresses imparted by the method of compression of the lay-up, this angulation of wood strands 10 results in a pressed composite assembly having an internal stress in one direction. When a lay-up comprised of strands 10 stacked as shown in FIG. 1 is compressed using a conventional press, a wood product bowed at its end as shown in FIG. 2 is produced.

The present invention provides methods for compensating for this unidirectional internal stress caused by card decking in a continuous process of forming elongate pressed composite assemblies.

Figure 3:
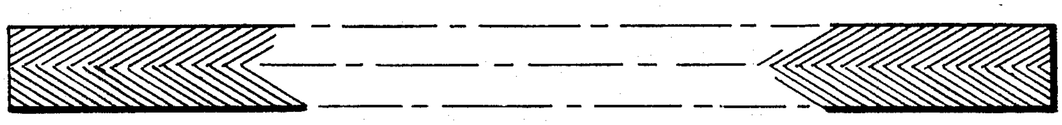
FIG. 3 is a schematic side elevational view of a pressed composite assembly prepared from two card decked strand lay-ups, one inverted on the other.

According to one embodiment of this invention, bowing in pressed composite assemblies formed from card decked strand lay-ups is eliminated by forming the composite from two card decked strand lay-ups one of which is inverted onto the other. A pressed composite assembly formed in this manner is illustrated in FIG. 3. As shown, when one card decked lay-up is inverted on another card decked strand lay-up, the card decking, when viewed from the side, provides a herringbone pattern in the resulting composite mat. By this method, the unidirectional internal stress caused by card decking, i.e., the angle at which the strands are stacked, in each strand lay-up is offset (symetrically) by the internal stress in the opposing, similarly card decked half of the pressed composite assembly.

Figure 4:
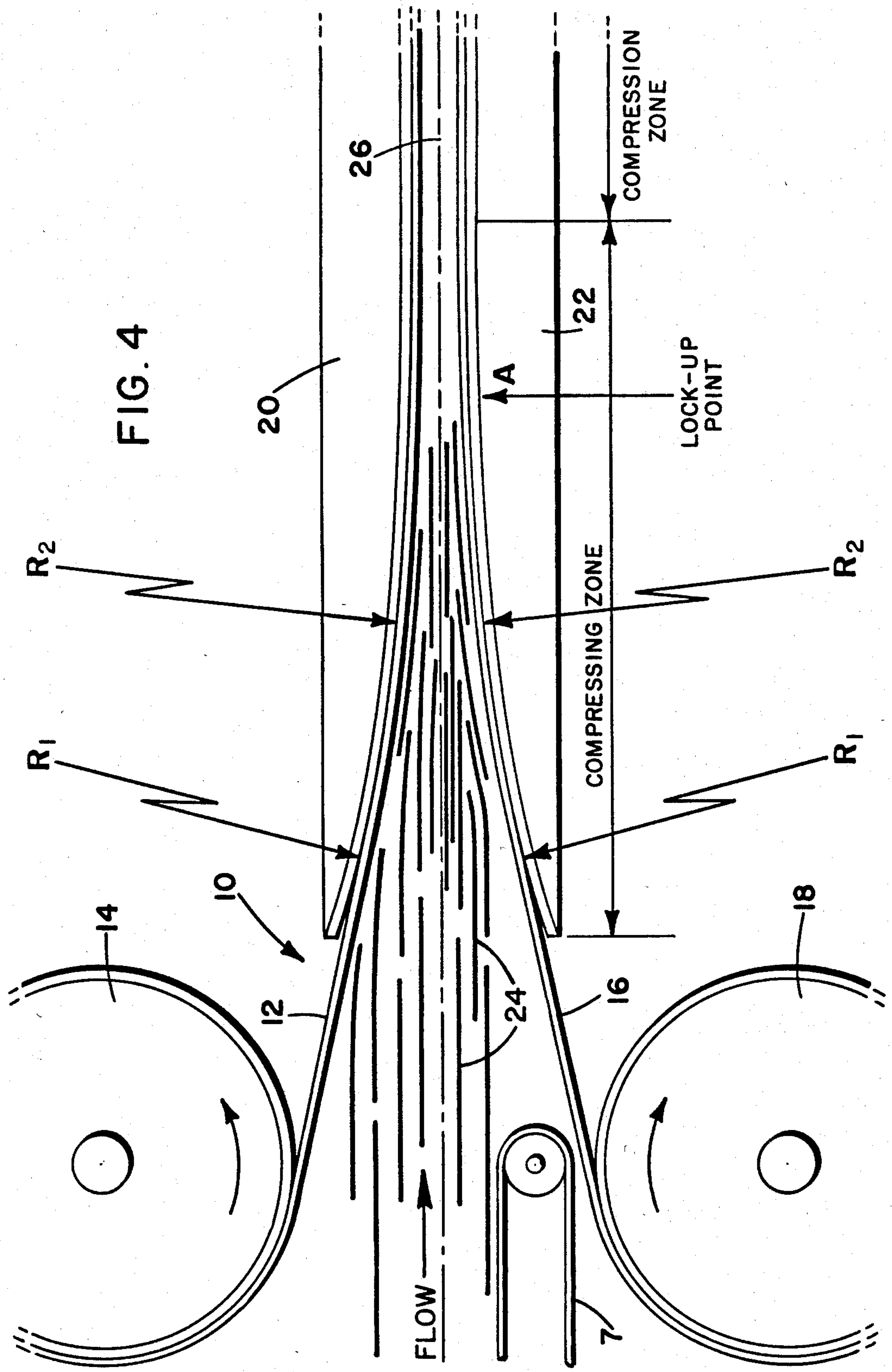
FIG. 4 is a diagrammatic side view of a belt press useful for producing pressed composite assemblies according to the present invention.

Referring next to FIG. 4, there is shown a belt press in accordance with the present invention designated generally as 10. Belt press 10 is shown diagrammatically because the press is of conventional construction. Conventional belt presses are illustrated in the aforementioned patents.

Belt press 10 includes an upper continuous press belt 12 trained about a pair of rotary drums, one of which 14 is shown in FIG. 4, and a lower continuous press belt 16 trained about a pair of rotary drums, one of which 18 is shown in FIG. 4. An upper platen 20 is located above upper press belt 12, and a lower platen 22 is placed below lower press belt 16. Platens 20 and 22 perform their conventional function of applying or keeping pressure on the material being moved between and with the belts 12 and 16. Press 10 can incorporate a heating device (not shown) to heat the material during its passage through the press. Numerous conventional heating devices are used with commercially available belt presses, and co-pending application Ser. No. 406,769, filed Aug. 10, 1982, entitled "Microwave Applicator for Continuous Press" describes in detail a microwave heating device in conjunction with a continuous press.

As seen in FIG. 4, a plurality of elongate wood strands 24 are aligned longitudinally on a conveyor and are fed between belts 12 and 16 from conveyor 7. As the wood strands 24 enter the area between platens 20 and 22, they are assembled in a random mass with generally parallel alignment. Central reference plane 26 extends medially between platens 20 and 22 and is parallel to the parallel downstream section of the platens 20 and 22. The area between the beginning of the platens 20 and 22 and the point where platens 20 and 22 begin their parallel runs is a compressing zone. Within the compressing zone, the distance between the platens 20 and 22 is decreasing. The portion of the press in which the platens 20 and 22 run parallel to each other is referred to herein as the compression zone.

Through a portion of the compressing zone, the wood strands 24 are permitting to move longitudinally relative to one another. At some point in the compressing zone, however, a state of compression is reached where strands 24 no longer can move relative to one another. This is referred to as a lock-up point. At the lock-up point, because of the curvature of the opposing press belts in the compressing zone, strands 24 near the belts will tend to develop a certain bowed configuration. As seen in FIG. 2, wood strands 24 take on a somewhat bowed configuration on either side of reference plane 26 as they proceed through the compressing zone. As further compressing continues, this bowed configuration is pressed out of the wood strands so that they take on a linear configuration of the pressed composite assembly in the compression zone.

Figure 5:
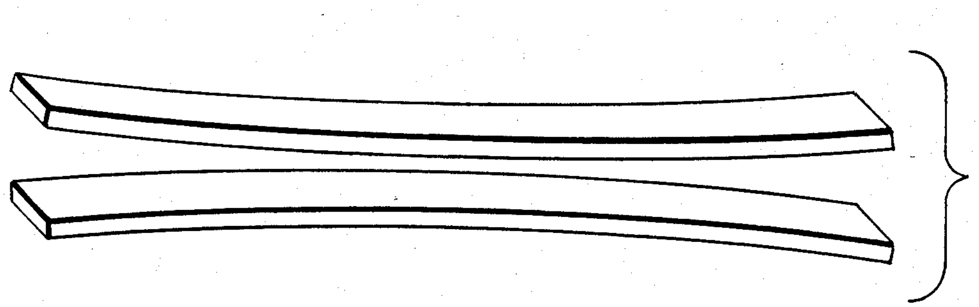
FIG. 5 illustrates an elongated lumber product, split horizontally, which was produced by prior art techniques wherein internal stresses due to a converging compressing zone were not relieved.

It has been discovered that the bowed configuration at lock-up results in a remembered internal stress. This internal stress is oppositely directed on either side of a reference plane 26 in a press of the type shown in FIG. 2. Generally, if the pressed composite assembly formed from a single lay-up is split horizontally, internal forces on either side of the reference plane 26 no longer balance each other and the remembered internal stress results in a bending or bowing of the split halves of the pressed composite assembly as shown, for example, in FIG. 5.

The point of lock-up for any given press will be a function of the original mat thickness, the final thickness of the pressed composite assembly, the density of the final pressed composite assembly and the strand properties including the coefficient of friction of the strand material. For $\frac{1}{8}''\times\frac{1}{2}''\times 8'$ wood strands compressed from a 12-inch thick lay-up to a 4-inch thick final product, lock-up occurred at a lay-up thickness of about 5 to 9 inches. The point of lock-up can generally be located by stopping operation of a continuous press and pulling out strands from the inlet until the strands that are locked between the press belts are identified.

The amount of residual bow for any given radius will depend to some degree upon the surface characteristics of the strands. For example, if strands are coated with an adhesive and wax mixture they will tend to slide more readily during the early stages of compression and the tendency to bow will be somewhat less. The use of lubricating additives to allow such sliding and thereby reduce the stress caused by compression is expressly contemplated by the present invention. Lubricating additives are well known in the art and include, inter alia, mineral and vegetable waxes, oils, soaps and the like.

The process conditions to which the lay-up is subjected during its passage through the press can also have an effect on residual bow. If the lay-up is heated to cure the resin, the heating may have a tendency to cause some stress relieving within the pressed composite assembly with a reduction in residual bow. In any event, such subsequent processing will not eliminate the residual bow.

It recently has been discovered that the internal stress in pressed composite assemblies caused by card decking can advantageously be used to compensate or offset the remembered internal stresses caused by the curvature of opposing press belts and platens in the compressing zone of apparatus for forming extended elongate pressed composite assemblies from a plurality of elongate stands. In many cases, the internal stress caused by card decking can be used to offset completely the remembered internal stresses due to the curvature in the compressing zone. As a result, relatively thick products, such as dimensioned lumber made of wood strands, can now be manufactured and may be cut horizontally without having opposing sections bow.

Figure 6:
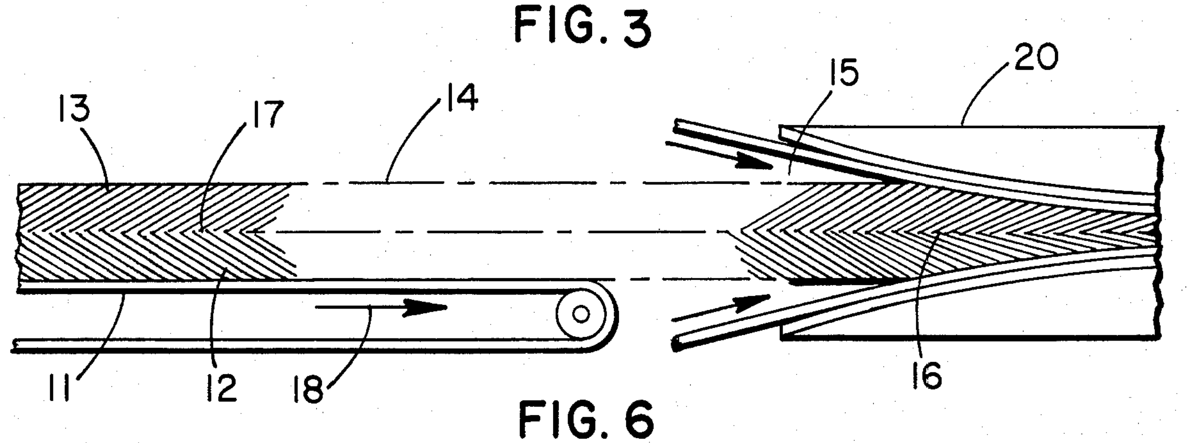
FIG. 6 is a schematic side elevational view of a composite mat being transported to a converging press assembly in a direction such that subsequent compression of the composite mat induces an internal stress in horizontal sections of the resultant pressed composite assembly opposite to the internal stress in such sections due to card decking. The mat is formed by inverting one card decked strand lay-up onto another.

According to one embodiment of this invention, two separate card decked lay-ups are formed, for example, as described in connection with FIG. 1. With reference to FIG. 6, one card decked lay-up 13 is then inverted and positioned above the other lay-up 12 so that the card decking, when viewed from the side, provides a herringbone pattern in the resulting composite mat 14. In this embodiment, lay-up 13 is positioned directly on top of lay-up 12. The composite mat is then conveyed by conveyor 11 into the converging compressing zone 15 of a belt press or similar compression device 20 such that the apex of the angle 17 formed between the strands of the first card decked lay-up 12 and the strands of the second, inverted card decked lay-up 13, points away from the inlet 16 to the compressing zone. The direction of travel is indicated by arrow 18. By so arranging the direction of card decking in each half of the composite mat, the internal stresses in the pressed composite assembly caused by compression in a converging press tends to offset the stresses in each half of the mat due to card decking. Because the stresses are offset, the tendency of the separate halves of the pressed composite assembly to bow when cut is reduced. Consequently, the assembly can be cut horizontally down its center to produce two linear pressed products.

The degree of card decking needed to offset remembered internal stresses in pressed composite assemblies due to the curvature induced in the compressing zone can be determined by routine experimentation, and will, inter alia, depend upon the length and characteristics of the strands, the dimensions of the pressed composite assembly and the radius of curvature of the press belts and platens at the point of lock-up. Co-pending application Ser. No. 547,574 entitled "Method for Pressing a Composite Assembly," filed concurrently herewith by Mark Churchland, describes a process for reducing the remembered internal stresses in pressed composite assemblies caused by the curvature of press belts and platens in the compressing zone. As disclosed in this co-pending application, the internal stresses caused by the curvature in the compressing zone can be minimized by increasing the radius of curvature at the point of lock-up.

Although the present invention finds particular applicability in the production of dimensioned lumber products from elongated wood strands, the invention is applicable to resilient strands generally. Typical strands include, without limitation, fiber glass in a resin matrix and synthetic or natural cords in an elastic matrix such as rubber. The strands have a length of at least about one foot and preferrably at least about two feet. For ease of presentation, the present invention has been described with respect to wood strands.

The wood strands which are preferably employed in the practice of this invention generally will have a length of at least about 1 or 2 feet and may have lengths of about 8 feet or more. The strands are desirably split or cut parallel to the grain of the wood. The strands often will have a width and thickness of from about 1/16" to about 1", preferably about $\frac{1}{8}$" to about $\frac{1}{2}$". It is possible and often probable that strands, used for assembly of a product in accordance with this invention, will vary in length from a minimum to a maximum length (e.g., from about 2 to about 8 feet). The adhesives used in a composite wood product include those known in the art and commonly used in wood products. Phenol formaldehyde can readily be employed.

Lay-ups formed from elongate strands will contain generally parallel strands in a generally random overlapping relationship. A final pressed composite assembly may have a thickness of at least about 2 inches and often at least about 4 inches. The height of the lay-up will be thicker before it is compressed to provide the final product. In the case of wood strands, a lay-up thickness of about 12 inches provided a final product of about 4 inches; i.e., a compression ratio of about 3:1.

Figure 7:
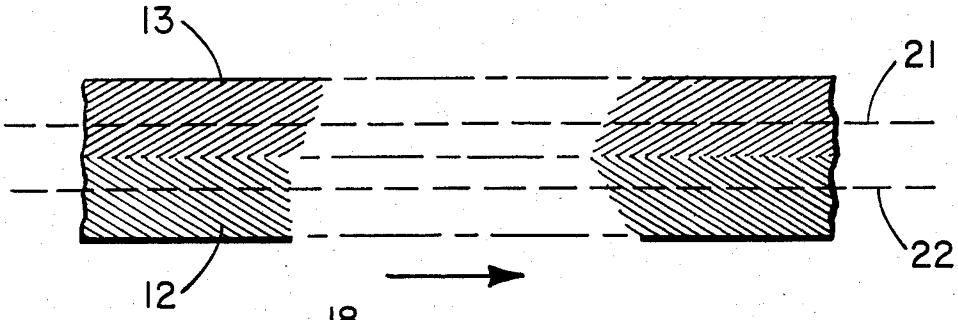
FIGS. 7, 8 and 9 are schematic side elevational views of composite mats, formed by inverting card decked strand lay-ups one upon the other. After being compressed in a converging press assembly, such mats can be cut or split horizontally without the separate pieces bowing.
Figure 8:
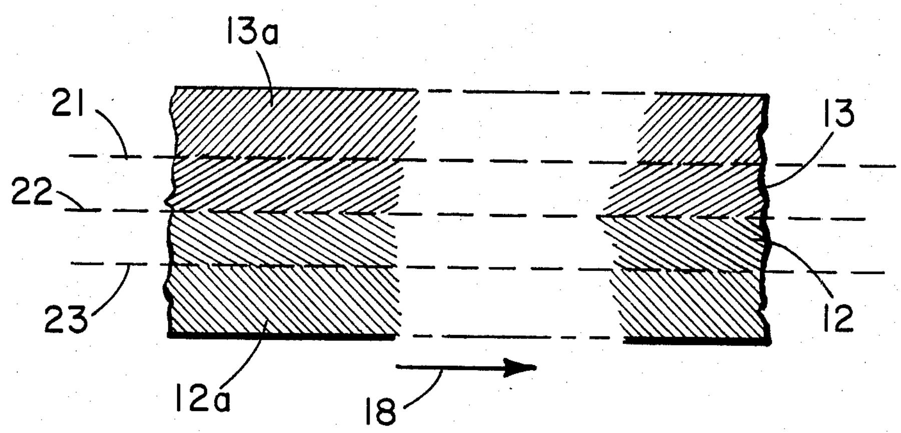
Figure 9:
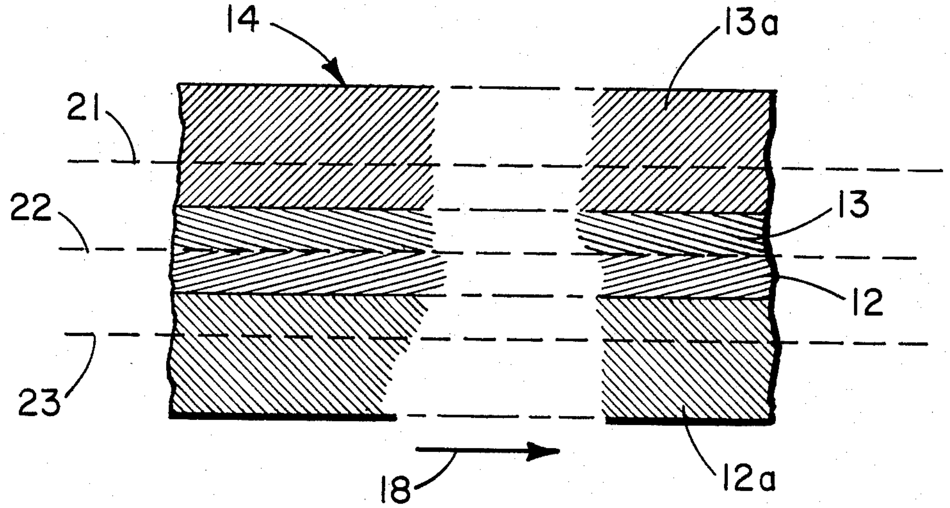

FIGS. 7 through 9 illustrate other arrangements of card decked strand lay-ups in composite mats designed to offset or minimize internal stresses in pressed composite assemblies caused by both card decking and the curvature induced in the compressing zone. With these arrangements, the pressed assembly can be cut or split horizontally into multiple pressed products, as indicated, without the separate pieces bowing. These arrangements permit the continuous manufacture of thicker pressed composite assemblies, that can then be cut or split horizontally into dimensioned products of any desired size.

FIG. 7 shows a composite mat formed by inverting one card decked strand lay-up 13 onto another card decked strand lay-up 12. Note that the general relationship of the two strand lay-ups 12 and 13, and the direction of travel 18 of the composite mat to a converging compressing zone (not shown), is the same as in the FIG. 6 embodiment. However, in order to produce three linear pressed products by cutting the resulting pressed composite assembly horizontally at two parallely spaced planes 21 and 22, the relative angle of the strands in the two lay-ups generally will differ from that employed in the FIG. 6 embodiment where only a single medial cut would be made. In the FIG. 7 embodiment, the angle of the card decking generally will be greater than in the FIG. 6 arrangement. Since two dimensioned products are cut from the outer section of each lay-up, a greater angle of card decking is needed to offset the greater degree of curvature induced near the surface of each lay-up in the composite mat as it passes through a converging compressing zone. The actual angle employed and the locus of planes 21 and 22 for making the horizontal cut will depend upon the variety of factors, discussed above in connection with FIG. 6, and can be determined by routine experimentation. Such factors include, inter alia, the length and characteristics of the strands, the mat thickness, the dimensions of the resultant composite assembly, and the radius of curvature of the press belts and platens at the point of lock-up.

FIGS. 8 and 9 show the relative orientation of card decked strand lay-ups in composite mats from which the resulting pressed composite assembly can be cut horizontally at three parallely spaced planes to form four linear dimensioned pressed products. The pressed composite assemblies are formed from a composite mat having four stacked strand lay-ups.

In FIG. 8, the mat is formed by inverted lay-ups 13 and **13*a* positioned above lay-ups 12 and 12*a* as shown. Note that the angle of card decking is greater in outer lay-ups 12*a* and 13*a* than it is in inner lay-ups 12 and 13. As discussed in connection with FIG. 7, this greater angle is required to offset the greater degree of curvature experienced by the outer lay-ups relative to the inner lay-ups during compression. The direction of travel of the composite mat is indicated by arrow 18. In this embodiment, the planes 21, 22 and 23**, at which the resulting pressed composite can be cut without causing bowing typically are defined by the boundaries of the various lay-ups.

In FIG. 9, the composite mat is prepared by forming a first lay-up **12*a* of card decked strands having a first angle of card decking; placing a first inverted, intermediate lay-up 12 of card decked strands having a second angle of card decking on the first lay-up, placing a second intermediate lay-up 13 of card decked strands of the second angle of card decking on the first intermediate lay-up; and finally inverting a second lay-up 13*a* of card decked strands of the first angle of card decking on the second intermediate lay-up. While as shown in FIG. 9, the "second angle" of layers 12 and 13 is greater than the "first angle" of layers 12*a* and 13*a*, the angles, if desired can be the same. As shown, the composite mat 14 consists of an inner composite formed by lay-ups 12 and 13 sandwiched between first and second lay-ups 12***a* and 13*a* arranged in an inverted relationship, wherein lay-up 13*a* is positioned above lay-up 12*a* in a manner analogous to that disclosed with respect to the FIGS. 6 through 8 embodiments. The inner lay-ups which are thinner reduce the induced forces of the outer lay-ups so that the four equivalent segments indicated in FIG. 9 will be straight when sawn. The intermediate lay-ups 12 and 13 are thinner.

Arrow 18 indicates the direction of travel of the composite mat 14 to a converging compressing zone (not shown). As shown, the composite mat is transported to the compressing zone (not shown) in a direction such that the apex of the angle formed between the strands of the first lay-up 12*a* and the strands of the second lay-up 13*a* points away from the inlet end of the compressing zone (not shown). The pressed composite assembly so-formed then is cut horizontally at planes 21, 22 and 23 to form the four linear pressed products. As shown in FIG. 9, plane 22 is defined by the boundary between lay-ups 12 and 13, while planes 21 and 23 are located within lay-ups 13*a* and 12*a* respectively.

The actual length of strands, angle of card decking, etc. necessary in each of the lay-ups of the FIGS. 8 and 9 embodiments to produce the desired effect, i.e., offsetting stresses arising from a curved compressing zone with those stresses due to card decking so that the compressed assembly can be cut horizontally into multiple dimensions products, will be influenced by the various factors specifically discussed above in connection with the FIG. 6 and FIG. 7 embodiments. Particular conditions for forming the pressed composite assemblies of FIGS. 8 and 9 can be determined by routine experimentation.

While the above embodiments illustrate the use of an even number of layers, 2, 4 or more, it will be appreciated that composite mats having an odd number of lay-ups (e.g., 3, 5, etc.) can also be employed depending upon the plane of the cut or cuts and/or the relative radii of the upper and lower curvature of the compressing zone. In such odd number lay-ups, at least two adjacent layers will be inverted with respect to each other. The other layers may, or may not, be inverted with respect to the adjacent layer or layers.

Products of different thicknesses can be sawn from the same composite assembly; that is, the cutting plane or planes can lie anywhere between the lower and upper surface. It will be seen from the foregoing description that a variety of lay-up layers and angles can be used to compensate or offset the remembered internal stress depending upon the number and size of the products to be sawn from the compressed composite assembly.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size and arrangement of parts, within the principle of the invention, to the full extent indicated by the broad general meaning of the terms in which the appended claims are expressed.

We claim:

1. In a continuous process of forming an elongate pressed composite assembly from a plurality of elongate strands by subjecting the strands to heat and pressure wherein the improvement comprises a method for compressing a particularly arranged composite mat of strands so as to compensate for internal stresses imparted to said pressed composite assembly during compressing because of the angle at which the strands are stacked, including the steps of:

(a) forming a first lay-up containing a plurality of strands in a generally parallel, longitudinally aligned relationship and in a generally random overlapping relationship wherein succeeding strands generally overlap only a portion of preceding strands so that the strands are, on the average, angled above the horizontal;

(b) forming a second lay-up containing a plurality of strands in a generally parallel, longitudinally aligned relationship and in a generally random overlapping relationship wherein succeeding strands generally overlap only a portion of preceding strands so that the strands are, on the average, angled above the horizontal;

(c) inverting one of said first or second lay-ups and positioning it on top of the other of said first or second lay-ups to form a composite mat; and (d) transporting the composite mat through a compressing zone of a press assembly whereby the internal stress in each half of the pressed composite assembly due to the angle at which the strands are stacked is offset by the internal stress in the opposing half of the pressed composite assembly.

2. In a continuous process of forming an elongate pressed composite assembly from a plurality of elongate strands by subjecting the strands to heat and pressure wherein the improvement comprises a method for compressing a particularly arranged composite mat of strands so as to compensate for internal stresses imparted to said pressed composite assembly during compressing because of both a converging compressing zone and because of the angle at which the strands are stacked, including the steps of:

(a) forming a first lay-up containing a plurality of strands in a generally parallel, longitudinally aligned relationship and in a generally random overlapping relationship wherein succeeding strands generally overlap only a portion of preceding strands so that the strands are, on the average, angled above the horizontal;

(b) forming a second lay-up containing a plurality of strands in a generally parallel, longitudinally aligned relationship and in a generally random overlapping relationship wherein succeeding strands generally overlap only a portion of preceding strands so that the strands are, on the average, angled above the horizontal;

(c) inverting one of said first or second lay-ups and positioning it above the other of said first or second lay-ups to form a composite mat; and (d) transporting the mat through a compressing zone from an inlet end to an outlet end defined between converging facing walls of a press assembly in a direction such that the apex of the angle formed between the strands of the first lay-up and the strands of the second lay-up points away from the inlet end to the compressing zone thereby inducing an internal stress in horizontal sections of the pressed composite assembly in a direction opposite the internal stress in said sections of the pressed composite assembly due to the angle of the strands in the lay-ups.

3. The process of claim 1 or 2 wherein the elongate strands are elongate wood strands coated with an adhesive.

4. The process of claim 1 wherein both the upper and lower press walls are curved within the compressing zone.

5. The process of claim 1 or 2 wherein said composite mat contains wood strands having a width and thickness of from about 1/16 to 1 inch and a length greater than about 3 feet.

6. The process of claim 1 or 2 wherein the strands have a lubricating additive.

7. The process of claim 1 or 2 in which the elongate strands are wood strands.

8. The process of claim 2 wherein the mat contains least three lay-ups.

9. The process of claim 2 wherein the mat contains at least four lay-ups.

10. The process of claim 2 wherein the pressed composite assembly is cut horizontally in one or more planes.

11. The process of claim 2 wherein the pressed composite assembly is formed by pressing a composite mat having four stacked strand lay-ups, and the pressed composite assembly is cut horizontally at three parallely spaced planes.

12. An elongate pressed composite assembly formed by compressing a particularly arranged composite mat of elongate strands in a press assembly so that the internal stress in each half of the pressed composite assembly due to the particular arrangement of elongate strands in said composite mat offset each other, said particularly arranged composite mat comprising one lay-up inverted and positioned on another lay-up said lay-ups containing a plurality of strands in a generally parallel, longitudinally aligned relationship and in a generally random overlapping relationship wherein succeeding strands generally overlap only a portion of preceding strands so that the strands are, on the average, angled above the horizontal.

13. An elongate pressed composite assembly formed by compressing a particularly arranged composite mat of elongate strands between converging facing walls of a press assembly so that the internal stress in horizontal sections of the pressed composite assembly due to said compressing is offset by a stress due to the particular arrangement of elongate strands in said composite mat, said particularly arranged composite mat comprising one lay-up inverted and positioned above another lay-up, said lay-ups containing a plurality of strands in a generally parallel, longitudinally aligned relationship and in a generally random overlapping relationship wherein succeeding strands generally overlap only a portion of preceding strands so that the strands are, on the average, angled above the horizontal.

14. The assembly of claim 12 or 13 wherein the elongate strands are elongate wood strands coated with an adhesive.

15. The assembly of claim 12 wherein both the upper and lower press walls in which said assembly is formed are curved within the compressing zone.

16. The assembly of claim 12 or 13 wherein said composite mat contains wood strands having a width and thickness of from about 1/16 to 1 inch and a length greater than about 3 feet.

17. The assembly of claim 12 or 13 wherein the strands have a lubricating additive.

18. The assembly of claim 12 or 13 in which the elongate strands are wood strands.

19. The assembly of claim 13 wherein said composite mat contains at least three stacked strand lay-ups.

20. The assembly of claim 13 wherein the mat contains at least four lay-ups.

* * * * *